US010843515B2

(12) United States Patent
Köster

(10) Patent No.: US 10,843,515 B2
(45) Date of Patent: Nov. 24, 2020

(54) TRAILER CONTROL DEVICE FOR MOUNTING ON A TRAILER

(71) Applicant: SAF-HOLLAND GmbH, Bessenbach (DE)

(72) Inventor: Mario Sebastian Köster, Bodman-Ludwigshafen (DE)

(73) Assignee: SAF-HOLLAND GmbH, Bessenbach (DE)

(*) Notice: Subject to any disclaimer, the term of this patent is extended or adjusted under 35 U.S.C. 154(b) by 0 days.

(21) Appl. No.: 16/639,693

(22) PCT Filed: Aug. 23, 2018

(86) PCT No.: PCT/EP2018/072780
§ 371 (c)(1),
(2) Date: Feb. 17, 2020

(87) PCT Pub. No.: WO2019/042862
PCT Pub. Date: Mar. 7, 2019

(65) Prior Publication Data
US 2020/0262257 A1 Aug. 20, 2020

(30) Foreign Application Priority Data
Aug. 31, 2017 (DE) .................. 10 2017 119 970

(51) Int. Cl.
G08B 21/00 (2006.01)
B60D 1/62 (2006.01)
(Continued)

(52) U.S. Cl.
CPC ............... B60D 1/62 (2013.01); B60D 1/36 (2013.01); B60D 1/06 (2013.01); B60R 1/00 (2013.01);
(Continued)

(58) Field of Classification Search
CPC ......... G05D 1/0225; G05D 2201/0216; G05D 1/0088; B60D 1/62; B60D 1/36; B60D 1/015
See application file for complete search history.

(56) References Cited

U.S. PATENT DOCUMENTS 5,905,433 A    5/1999  Wortham
9,315,212 B1*  4/2016  Kyrtsos .............. B62D 15/0285
(Continued)

FOREIGN PATENT DOCUMENTS

WO    2017100716 A1    6/2017

OTHER PUBLICATIONS

European Patent Office; International Search Report; dated Nov. 28, 2018.

Primary Examiner — Toan N Pham
(74) Attorney, Agent, or Firm — Price Heneveld LLP

(57) ABSTRACT

A trailer control device for mounting on a trailer, wherein the trailer control device includes a receiver unit configured to receive a signal from an external transmitter unit, a comparator connected to the receiver unit and configured to compare the received signal with a pre-defined signal stored in the comparator, and a transmitter unit connected to the comparator and configured to send a response signal to an external receiver unit for locating and/or identifying the trailer control device if the received signal matches the pre-defined signal.

14 Claims, 6 Drawing Sheets

(51) Int. Cl.
  *B60D 1/36* (2006.01)
  *B60R 1/00* (2006.01)
  *B60D 1/06* (2006.01)

(52) U.S. Cl.
  CPC ..... *B60R 2300/10* (2013.01); *B60R 2300/808* (2013.01); *B60W 2300/14* (2013.01)

(56) References Cited

U.S. PATENT DOCUMENTS

| | | |
|---|---|---|
| 9,738,125 B1 | 8/2017 | Brickley et al. |
| 2004/0183673 A1 | 9/2004 | Nageli |
| 2007/0119927 A1 | 5/2007 | Wingo et al. |
| 2008/0303648 A1 | 12/2008 | Day |
| 2009/0236825 A1 | 9/2009 | Okuda et al. |
| 2019/0337342 A1* | 11/2019 | Genheimer ............. B60D 1/62 |

* cited by examiner

TRAILER CONTROL DEVICE FOR MOUNTING ON A TRAILER

BACKGROUND OF THE INVENTION

The present invention relates to a trailer control device for mounting on a trailer, a trailer on which a trailer control device is mounted, and a system for locating and/or identifying a trailer with a trailer control device.

The identification of trailers is normally carried out manually. To achieve this a driver of a traction vehicle either receives instructions from a logistics staff member or must locate the trailer to be coupled independently. Devices or systems for automatically locating a trailer are not yet known.

The object of the present invention is therefore to provide a device with which a trailer can be located automatically. In addition, the object of the present invention is to provide an automatically locatable trailer and a corresponding system for locating or identifying a trailer.

SUMMARY OF THE INVENTION

According to the invention a trailer control device for mounting on a trailer is proposed, the trailer control device comprising the following: a receiver unit for receiving a signal from an external transmitter unit, a comparator connected to the receiver unit for comparing the received signal with a pre-defined signal stored in the comparator, and a transmitter unit connected to the comparator for sending a response signal to an external receiver unit for locating and/or identifying the trailer control device if the received signal matches the pre-defined signal.

The proposed trailer control device therefore comprises a receiver unit, which can receive an external signal. The external signal can be, for example, a GPS signal or a GPRS signal or a radio signal from a local transmitter mast. The external received signal can comprise, for example, requesting an ID code and/or coordinates with respect to the current position and/or trailer-specific data, or any other query to request an identity and/or the position of the trailer. The trailer control device also comprises a comparator, which is connected to the receiver unit. The comparator is used for comparing the received signal with a pre-defined signal stored in the comparator. The pre-defined signal can be, for example, an identification code. The pre-defined signal is compared with the received signal in the comparator. If the received signal matches the pre-defined signal, a transmitter unit connected to the comparator sends a response signal to an external receiver unit so that the trailer control device can be located and/or identified. The external transmitter unit and the external receiver unit can either be two separate units or implemented in a single unit. In addition, the receiver unit of the trailer control device and the transmitter unit of the trailer control device can either be implemented as two separate units or combined in a single unit. In either case, both the receiver unit and the transmitter unit are in signal connection with the comparator. The connection to the comparator can be made, for example, over a wired connection or wirelessly. In the case of a wireless connection, for example, a Bluetooth connection or the like can establish the communication between the receiver unit, the comparator and the transmitter unit. Mounting the proposed trailer control device on a trailer has the advantage that the trailer control device can be located and/or identified automatically.

In accordance with another preferred embodiment of the trailer control device, the trailer control device has an encryption unit for encrypting the response signal and/or a decryption unit for decrypting the received signal. In particular, the encryption unit and/or the decryption unit is/are connected between the receiver unit and the comparator, or between the transmitter unit and the comparator. The received signal can consequently be received by the receiver unit as an encrypted signal. The receiver unit then firstly forwards the received signal to the decryption unit, in which the received signal is first decrypted. It is also conceivable for the decryption unit to be integrated in the receiver unit and that a received signal is automatically decrypted in the receiving unit also. The decrypted signal is then passed to the comparator, where it is compared with the pre-defined signal. In the event of a match between the received signal and the pre-defined signal a response signal is forwarded to the transmitter unit, which signal is encrypted by the encryption unit, to which the transmitter unit is connected, before it is sent by the transmitter unit to the external receiver unit. It is conceivable for the encryption unit to be integrated in the transmitter unit and an encryption of an outgoing response signal to take place automatically. The encryption unit and/or the decryption unit each have the advantage that a secure communication can be established between the trailer control device and an external receiver unit or an external transmitter unit.

Preferably, the trailer control device has a position determination unit, which is implemented, in particular, as a GPS unit. The position determination unit is used to determine a current position of the trailer control device. In particular, the position determination unit is in signal connection with the comparator and/or the encryption unit or the decryption unit for communication purposes. The position determination unit is preferably also designed to communicate with another external GPS unit to query the current position of the trailer control device. This has the advantage that a current position of the trailer control device can always be queried by the trailer control device and can be sent to an external receiver unit. This means that the current position of the trailer control device can always be located or identified.

Also preferably, the trailer control device has a memory unit for storing the pre-defined signal and/or the current position and/or the response signal and/or the response signal and/or other data. In particular, the memory unit is connected to at least one of the other units comprised by the trailer control device for communication purposes. The memory unit is particularly preferably in signal connection with the comparator. Also particularly preferably, the memory unit is in signal communication with all other units included in the trailer control device, either directly or in a transitive manner. A memory unit in the trailer control device has the advantage that a chronology with regard to the occupied or current positions of the trailer control device or with regard to other information, such as the loading of the trailer or the like, is stored in the trailer control device. Such a chronology with regard to the position or with regard to other information may be stored, in particular, as a function of time. This allows, for example, the use of the trailer control device, or a trailer on which the trailer control device is mounted, to be documented.

Preferably, the communication between the various units of the trailer control device is carried out, among other ways, by means of a wired connection or a wireless connection, in particular via Bluetooth or the like.

Also preferably, the trailer control device has an energy source for supplying the trailer control device with energy.

The energy source can be in electrical contact, for example by means of a charging station, in particular comprising a battery and/or a solar cell, and/or by means of a connection between the trailer control device and a trailer on which the trailer control device is mounted, so that the energy source can be charged via the trailer, which is connected in particular to a traction vehicle.

The emitted and received signals are preferably radio signals in each case. In particular, the emitted and received signals can be transferred to an external receiver unit or from an external transmitter unit by means of GPS. In addition, the radio signals can also be sent to or from the trailer control device by means of local transmitter masts. In the present case the term "signal" is also understood to mean a "response signal" or a signal for querying a current position of the trailer control device.

A further aspect of the present invention relates to a trailer, on which a trailer control device, in particular according to one of the trailer control devices already described, for sending and receiving a signal is mounted, in particular permanently mounted. The trailer in this case comprises the trailer control device which has at least one receiver unit for receiving a signal, a transmitter unit for sending a response signal, and a comparator. The trailer control device in this case is advantageously permanently mounted on the trailer. In other words, this can mean that the trailer control device is not merely mounted temporarily, but is designed to be fixed to the trailer over a long period of time, in particular for years. Advantageously, this fixing is carried out via a screw and/or rivet connection in order to provide a secure and as permanent as possible fixing. In addition, the trailer control device is designed for controlling the different units. The comparator is designed to compare the signal to be received with a pre-defined signal. The trailer control device is designed, after detecting a match between the received signal and the pre-defined signal, to control the transmitter unit in such a way that the transmitter unit sends at least one response signal to an external receiver unit for locating and/or, in particular, identifying the trailer. This has the advantage that a trailer on which a described control unit as described above is mounted can be located automatically or identified automatically, thus potentially saving time and avoiding cases of confusion. In particular, therefore, locating a trailer in a fleet of vehicles can be carried out automatically with the proposed invention.

The response signal preferably comprises a coded identification signal for identifying the trailer and/or for identifying a current position of the trailer and/or for transmitting trailer vehicle data. Furthermore, the coded identification signal can comprise trailer-specific information, such as the dimensions of the trailer and/or the weight of the trailer and/or the year of manufacture of the trailer or the like. This has the advantage that a response signal may be emitted by more than one trailer if an identification signal associated with one of the trailers matches the queried received signal. This has the advantage that, for example, one type of trailer can be automatically selected from a plurality of trailers and located. A user can subsequently select which trailer should be located.

According to a preferred embodiment the trailer control device is arranged at a pre-defined position on or in the trailer. To obtain good accessibility of the trailer control device, for example to simplify repairs and/or maintenance operations, it is convenient if the device is arranged underneath the loading area of the trailer. Alternatively, the trailer control device can also preferably be arranged on top of and/or on a roof structure of the trailer covering the loading area, since this can improve or simplify the reception and/or transmission of signals. In particular, the trailer control device is arranged at an equal distance from two edges of the trailer and/or at a defined distance from a king pin of the trailer to enable, in particular, a unique location of the trailer. The distance from two edges of the trailer indicates, for example, a width or length of the trailer. The arrangement of the trailer control device at a given pre-defined position of the trailer means that a trailer can be uniquely located or identified. In particular, a distance from a king pin of the trailer can be used to uniquely identify the trailer. In addition, it allows the extent of the trailer in all spatial dimensions to be queried.

Preferably, the response signal emitted from the trailer control device comprises at least one of the following pieces of information: vehicle/and/or order identification, general data relating to the trailer, in particular dimensions and/or hitching height and/or permissible overall weight and/or vehicle type and/or tires and/or year of manufacture, position of the king pin and/or the tiller in relation to the trailer, to the trailer control device or to the evaluation unit or to a front side of the trailer, alignment of the trailer, order and/or load data, in particular data relating to the contents and/or weight and/or delivery note, loading state of the trailer, fill level of a tank trailer, refrigerated room temperature of the trailer, maintenance condition and/or maintenance intervals and/or data on the last maintenance of the trailer, tire pressure of the trailer, mileage of the trailer, fault and maintenance log of the trailer, access logs for the cargo compartment of the trailer.

Depending on the received signal, which comprises a query of the possible pieces of information, the response signal can comprise any possible combination of the listed information. It is also conceivable that other queriable information may be programmed or stored in the trailer control device by a user.

For the purpose of manual inspection an optical identification, in particular, a bar code, a matrix code, a number code or a color code is preferably arranged on the trailer and/or on the trailer control device. The advantage of this is that after an automatic location or identification of the trailer, the trailer can be inspected again manually by a user. This means that incorrect couplings of the trailer to a traction vehicle can be additionally prevented.

A further aspect of the present invention relates to a system for locating and/or identifying a trailer with a trailer control device, in particular with a trailer control device as already described, which is mounted on a trailer, in particular on a trailer as already described. The proposed system also comprises an external transmitter unit for sending a signal to the trailer control device to locate the trailer and an external receiver unit for receiving a response signal from the trailer control device for locating and/or identifying the located trailer, wherein the trailer control device emits the response signal if a match is detected between the received signal and a signal specified in the trailer control device. For example, the external transmitter unit and the external receiver unit can be arranged in a traction vehicle or in a stationary logistics unit, such as in a building. In addition, the external transmitter unit and the external receiver unit can be combined in a single unit. Using the described system, for example, a traction vehicle can automatically locate a trailer which is arranged on a trailer device as described. A manual location of a trailer is therefore no longer necessary. This has the advantage that locating a trailer, for example in a vehicle fleet, can be carried out faster.

Preferably, the trailer control device is mounted on the trailer in such a way that an external receiver unit identifies, in particular uniquely, a position of the located trailer. When the trailer control device is used on a trailer in the proposed system, a traction vehicle can thus locate or identify a trailer, for example, automatically. The external receiver unit is preferably arranged in a, in particular stationary, logistics unit or in a traction vehicle. It is also conceivable that a, in particular stationary, logistics unit locates or identifies a trailer and transmits the corresponding current position data to a traction vehicle, so that the traction vehicle can control the corresponding trailer.

According to a preferred embodiment of the proposed system, the external transmitter unit sends the at least one signal to a plurality of trailer control devices at the same time, wherein in particular only one trailer control device sends a response signal to the external receiver unit after detection of a match between the emitted signal and a pre-defined signal stored in a trailer control device. This has the advantage that, for example, a trailer in a vehicle fleet can be located automatically. It is also conceivable that a trailer type can be located in a vehicle fleet. A trailer type in the present case means a trailer with a given weight or with a given size or the like. Therefore if a trailer of a certain type is sought, a signal can be emitted to a plurality of trailers, so that only trailers which belong to the appropriate type of trailer to be located will emit a corresponding response signal to the external receiver unit. Accordingly, it is then possible for a user to select a trailer and then uniquely control it.

The response signal is preferably displayed to a user of the trailer visually, in particular on a navigation system, to locate the trailer. For example, if a user is in a traction vehicle, then the user can be navigated to the trailer using the traction vehicle by means of a navigation system.

It is also preferable that the response signal is designed to support an automatic coupling process between the trailer being retrieved and a traction vehicle which comprises the external receiver unit, in particular by transmission of location coordinates. With the proposed system, a trailer or trailer control device can thus be initially located or identified and then, for example, a traction vehicle can be coupled to such a trailer. In particular, such a coupling process takes place automatically. For such an automatic coupling process, a coupling system comprising a traction vehicle and a trailer can also be provided, as will be explained below in the description of the figures.

BRIEF DESCRIPTION OF THE DRAWINGS

Other advantages and features of the present invention are derived from the following description of preferred embodiments and with reference to the accompanying drawings. It goes without saying that individual embodiments shown in the respective figures can have features that may also be used in other embodiments, even if this is not explicitly mentioned and provided this is not excluded due to technical circumstances or explicitly. Shown are.

DETAILED DESCRIPTION OF THE PREFERRED EMBODIMENTS

Figure 1:
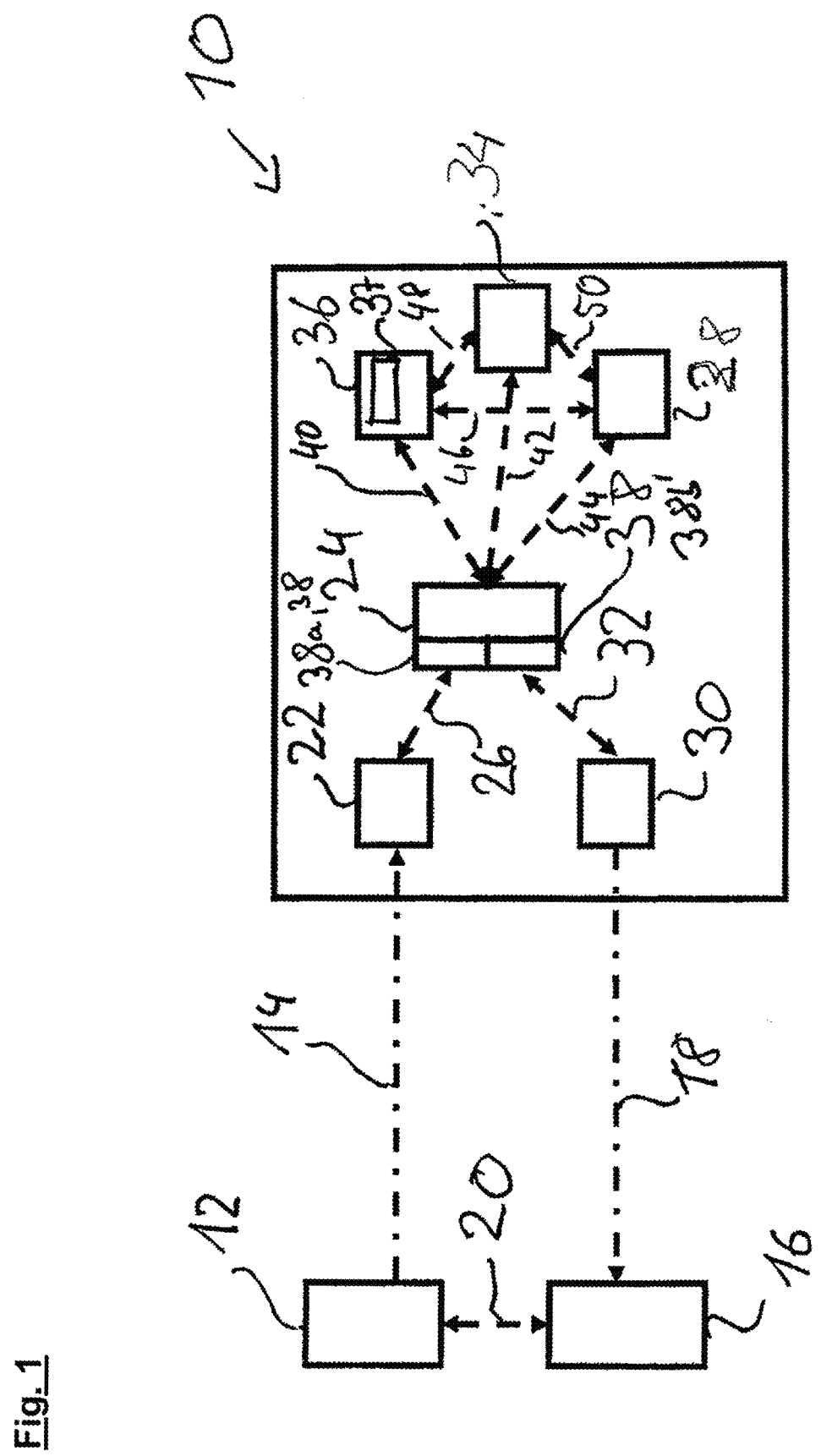
FIG. 1 shows a schematic view of a trailer control device, which can interact with a transmitter unit and/or a receiver unit.

FIG. 1 shows a trailer control device 10 which can communicate with a transmitter unit 12. The communication between the transmitter unit 12 and the trailer control device 10 is indicated by the arrow 14. Also, the trailer control device 10 can communicate with a receiver unit 16. This communication is indicated by the arrow 18. In addition, it is conceivable that the transmitter unit 12 and the receiver unit 16 can communicate with each other, which is indicated by the double arrow 20. It is conceivable that the transmitter unit 12 and the receiver unit 16 are combined together in a single unit (not shown).

To receive a signal from the external transmitter unit 12 the trailer control device 10 has a receiver unit 22 which forwards the received signal to a comparator 24. Between the receiver unit 22 and the comparator 24 a wired connection or a wireless connection can be provided. The communication between the comparator 24 and the receiver unit 22 is shown in FIG. 1 by the double arrow 26. The comparator 24 is designed to compare the signal to be received with a pre-defined signal. The pre-defined signal can be stored in the comparator 24 itself or in a memory unit 28. The comparator 24 and the memory unit 28 can communicate with each other (double arrow 44).

If the received signal matches the pre-defined signal, the comparator 24 submits a response signal to a transmitter unit 30, which is indicated by the double arrow 32. In the memory unit 28, in addition to the pre-defined signal the current position and/or the response signal or other data can also be stored again or have already been stored.

In particular, the memory unit 28 is communicatively connected to other units 34, 36, 38. The communication of the units 24, 28, 34, 36, 38 between one another is shown schematically by the double arrows 40, 42, 44, 46, 48, 50.

As shown in FIG. 1, the memory unit 28 is coupled, for example, to a position determination unit 36. The position determination unit 36 is designed in particular as a GPS unit and is used to determine a current position of the trailer control device 10. The position determination unit 36 is connected to the comparator 24 and/or an encryption unit 38, 38b or a decryption unit 38, 38a for communication purposes. In particular, the decryption unit 38, 38a and/or the encryption unit 38, 38b is designed as one unit. It is also conceivable that the decryption unit 38a and the encryption unit 38b are designed as two different units. The encryption unit 38, 38b or the decryption unit 38, 38a are optional.

As shown in FIG. 1, the trailer control device 10 can have an energy source 34, which supplies the other units of the trailer control device with energy. The energy source 34 can be designed, for example, with a rechargeable battery, which can charge itself when a trailer on which the trailer control device 10 is mounted is coupled to a traction vehicle.

Figure 2:
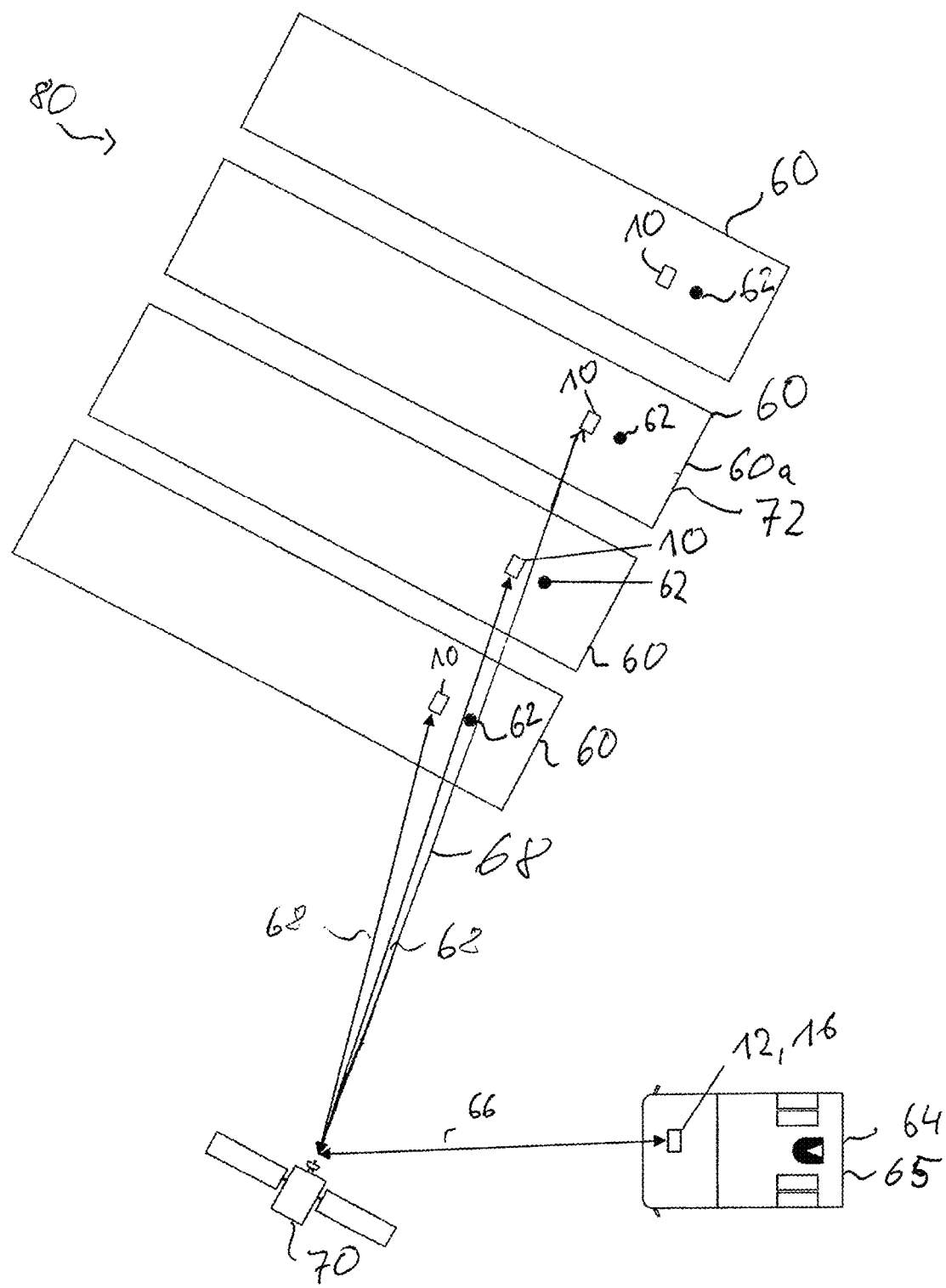
FIG. 2 shows a system according to the invention for locating and/or identifying a trailer with a trailer control device.
Figure 3:
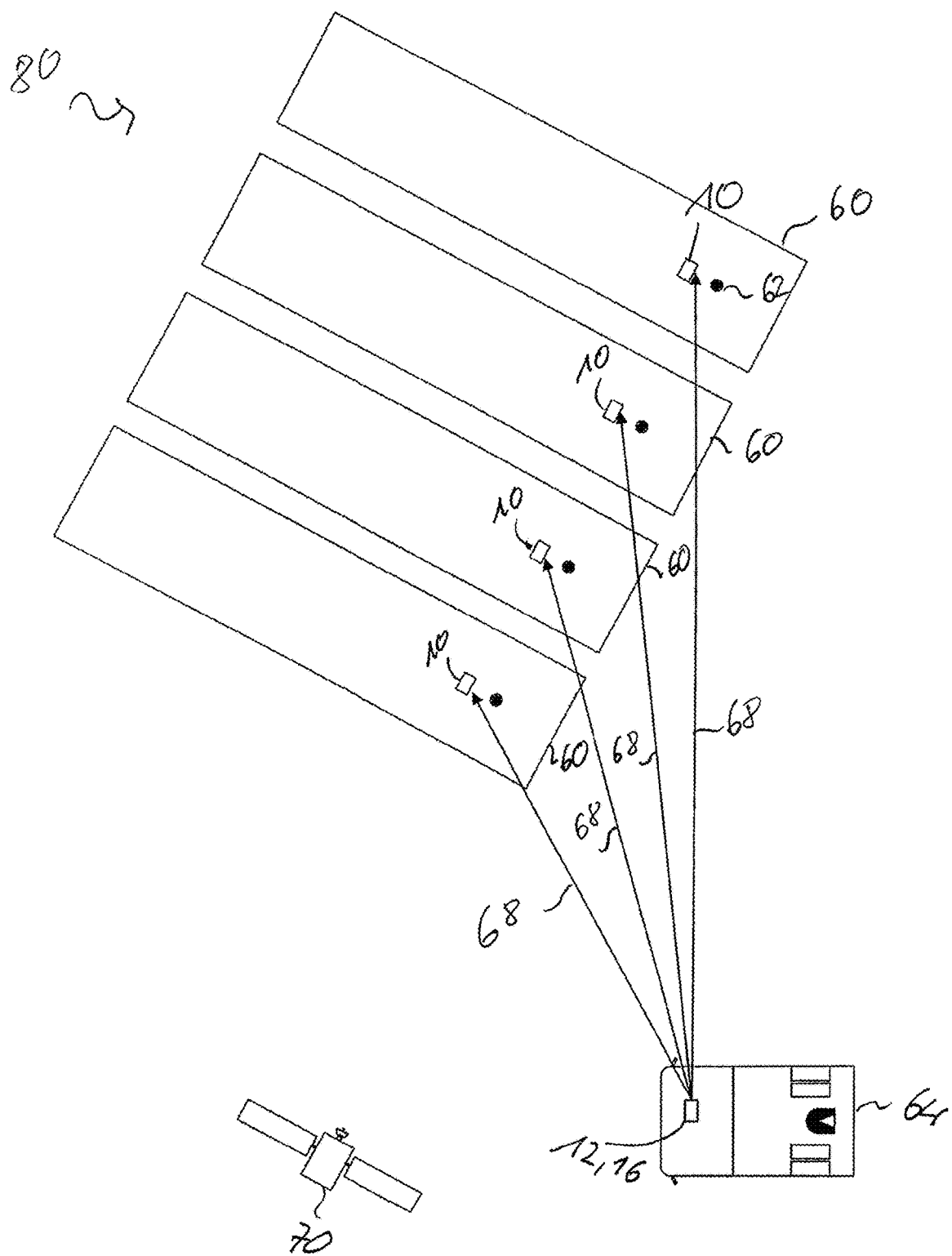
FIG. 3 shows an exemplary embodiment of the system according to the invention.
Figure 4:
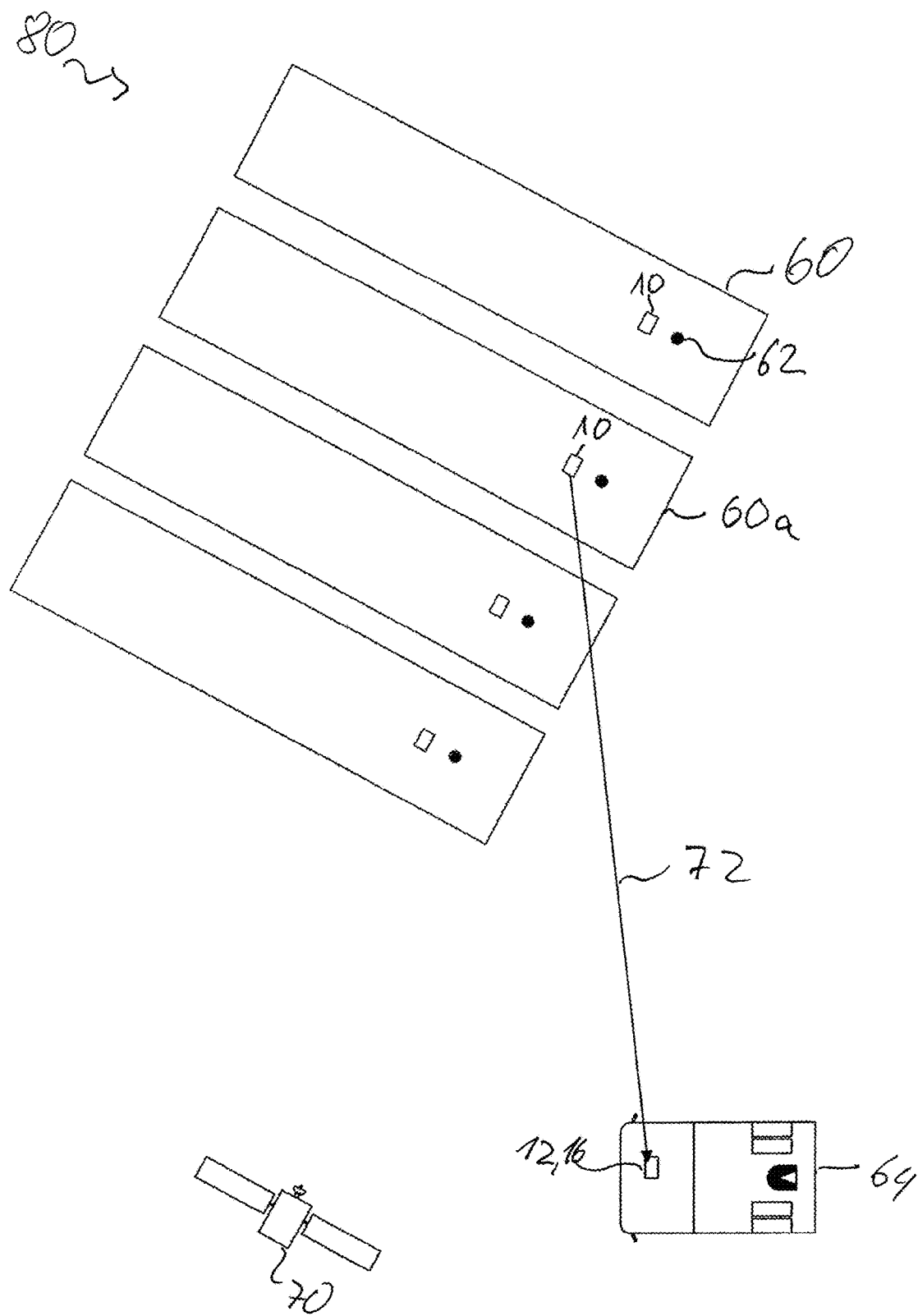
FIG. 4 shows a system in accordance with the FIGS. 3 and 2, which transmits a response signal to an external receiver unit.

Taking a synopsis of the FIGS. 2, 3 and 4 the embodiments of the system 80 according to the invention are described in the following. The FIGS. 2, 3 and 4 therefore each show a system 80 according to the invention. In particular, FIG. 2 shows how a traction vehicle 64, which comprises the external transmitter unit 12 and/or the external receiver unit 16, transmits a signal to an external GPS unit 70. The external GPS unit 70 forwards the signal to the trailer control devices 10, each of which is mounted on a trailer 60. The signal forwarding operations are each shown by the arrows 66 and 68 in FIG. 2. Each of the trailers 60 has a king pin 62 in addition to the trailer control device 10, to which the traction vehicle 64 can be coupled. As shown in FIG. 2, the traction vehicle 64 or the external transmitter unit 12 of the traction vehicle 64 first transmits a signal to multiple trailers 60 to determine the current position of a trailer 60a to be located.

FIG. 2 shows an embodiment of the system, in which the traction vehicle 64 or the stationary logistics unit transmits the signal to be received by the trailers 60 via an external GPS unit 70 to the trailers 60. In accordance with the embodiment which is shown in FIG. 3, the traction vehicle 64 or the stationary logistics unit transmits the signal directly to the trailer control devices 10 of the trailers 60. This may also be carried out, for example, via local transmitter masts (not shown). The received signal from each trailer 60 or from each trailer control device 10 which is mounted on a trailer 60, as already described above with regard to FIG. 1, is evaluated, i.e. compared with a pre-defined signal. If any pre-defined signal matches the received signal, a trailer 60, i.e. the trailer 60a to be located, sends a response signal back to the receiver unit 16 in the traction vehicle 64. In the proposed system 80, in order to locate a trailer 60a from a plurality of trailers 60, a query signal is first sent to a plurality of trailers 60. Only if the received signal matches a pre-defined signal, which is preferably stored in the trailer control device 10, does the corresponding trailer 60a which is to be located send a response signal back to the traction vehicle 64 or the stationary logistics unit. By sending back the response signal, which is indicated with the reference numeral 72 in FIG. 4, the trailer 60a to be located can be identified or located. The locating of the trailer 60a is carried out in particular automatically. Such a locating process is shown schematically in FIG. 4, wherein such a locating process is carried out both in a system according to FIG. 2 and also according to FIG. 3.

Figures 5A, 5B:
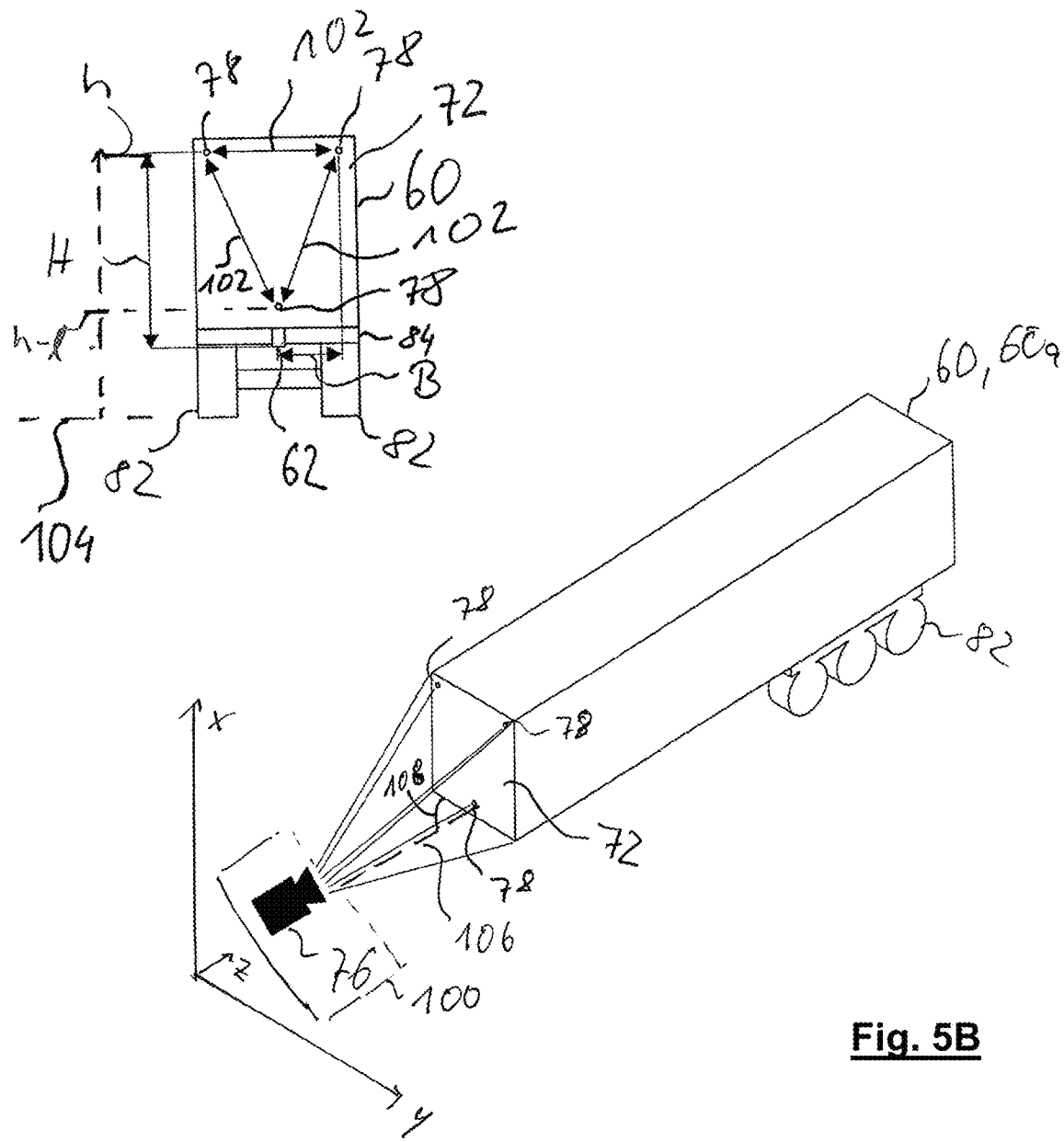
FIGS. 5A and 5B show a trailer, in particular a tractor-trailer, on which a trailer control device according to the invention is mounted.

FIGS. 5A and 5B show a trailer 60 or a located trailer 60a, to which a traction vehicle 64 is to be coupled after the trailer 60a has been located. To support the process between traction vehicle 64 and trailer 60a the response signal can in particular comprise location coordinates, which supports an automatic coupling between the trailer 60a and the traction vehicle 64. Only represented schematically in FIGS. 5A and 5B is a camera system 76, which is preferably arranged on the traction vehicle 64 (not shown). Such a camera system 76 can further support the coupling process between the traction vehicle 64 and the trailer 60, 60a, in particular to provide a visual display for a driver of the traction vehicle 64. To support the coupling process between the trailer 60a and the traction vehicle 64, fixed points 78 are arranged on the trailer 60, 60a, which can be captured by the camera system 76. The fixed points 78 allow the king pin 62 to be located, in particular supported by a driver. This is because a height H and/or a width B of the fixed points 78 relative to the king pin 62 of the trailer are specified permanently and independent of a loading of the trailer 62. The locating of the fixed points 78 can therefore assist a driver to approach the trailer 62 correctly, and they can be detected and used by the camera system 76 to display any brief corrections of the traction vehicle that may be needed. In particular, a height h can be changed by loading of the trailer 60, 60a or by a current tire pressure of the tires 82. Therefore, it is important that the height H is independent of the loading state. In particular, a fixed point 78 specifies a distance between the king pin 62 and an outer edge 84 of the trailer 60, 60a.

Figure 6:
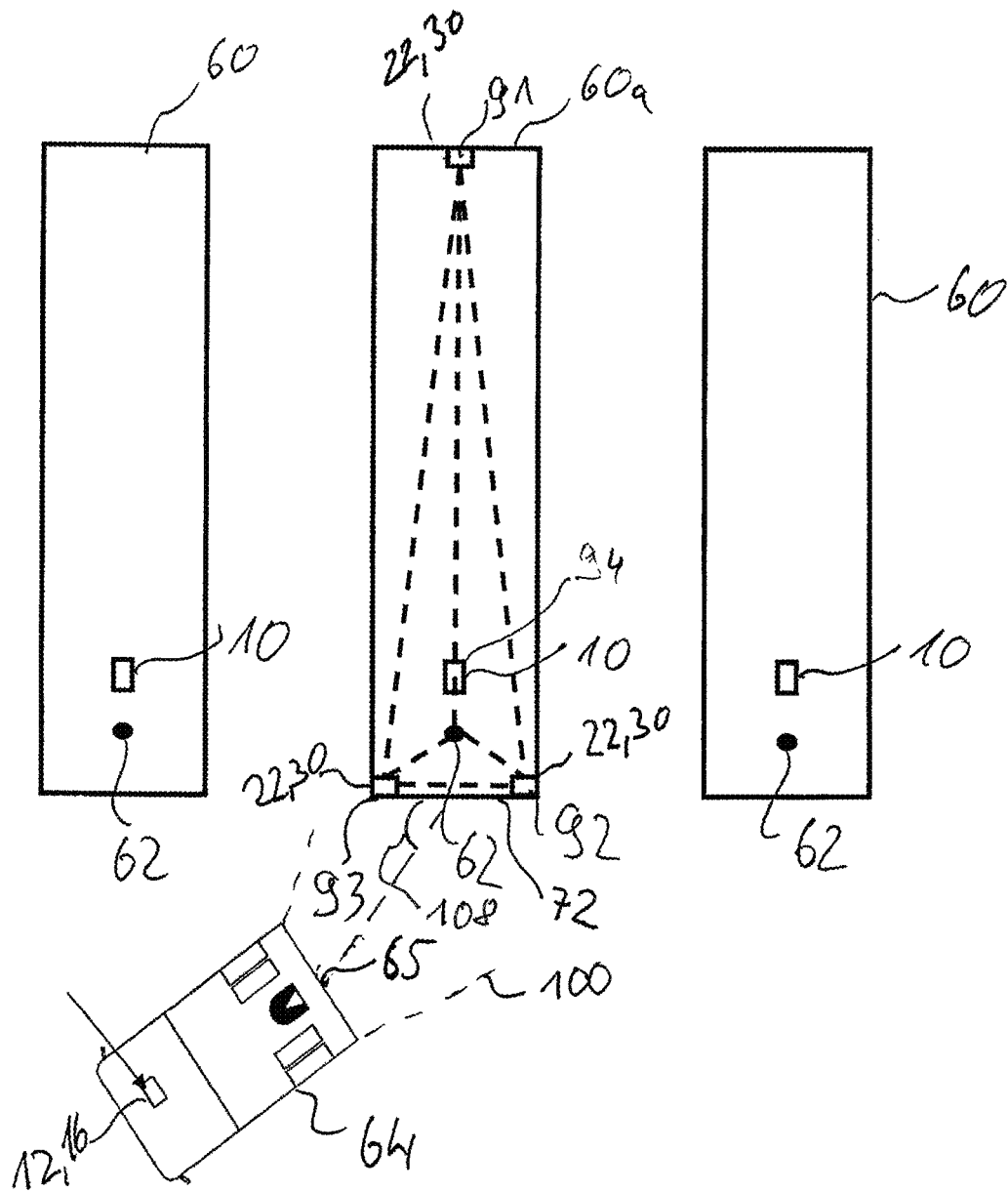
FIG. 6 shows a schematic plan view of a coupling system, which following a determination of the position and orientation of a trailer to be coupled in a vehicle fleet can be used in a coupling process.

FIG. 6 shows a plurality of trailers 60, each with a trailer control device 10 and a king pin 62. The located trailer 60a also has a coupling system with specified positions 91, 92, 93 of the located trailer 60, 60a. The specified positions 91, 92, 93 of the trailer 60, 60a can each be detected via a transceiver unit. The detected positions 91, 92, 93 can then be evaluated by means of an evaluation unit 37, which is integrated in the trailer control device 10. In the evaluation unit 37, for example, straight lines or levels are determined using the detected points 91, 92 and 93. It is also conceivable that the trailer control device 10 also represents a detected position 94. The detected positions 91-94 can then be determined, for example, in relation to the king pin 62 of the located trailer 60a. The transceiver unit of the trailer 60, 60a queries, for example, via an external GPS system 70 or via local transmitter masts, the current position, i.e. the coordinates of the corresponding fixed point 91-94. By means of the detected points 91-94, using a software the position and orientation of the trailer 60, 60a is determined, in particular in relation to the king pin and, if appropriate, stored in the memory unit 28. The necessary position data are preferably transmitted via wireless connection from the trailer control unit 10 to a traction vehicle 64, so that the traction vehicle unit 64 can control the located trailer 60a and a coupling can be carried out between the traction vehicle 64 and the trailer 60a.

After the trailer 60a has been located, the traction vehicle 64 controls the located trailer 60a to couple it. In order to carry out the coupling process the detection unit 100, which comprises, in particular, a camera system 76 and/or a sensor system and is arranged on a coupling side 65 of the traction vehicle 64, captures the detectable pattern 77 on a coupling side 72 of the trailer 60, 60a, wherein the detectable pattern 77 is provided by the specified points 78. The detection unit 100 can capture the detectable pattern 77, for example, using ultrasound and/or optically or by similar means. As shown in FIG. 5, the fixed points 78 are arranged in a triangle configuration on the coupling side 72, wherein two of the fixed points are each arranged on a upper outer region, above the Earth's surface 104 at a height h and a fixed specified point 78 is arranged above the king pin 62 at a height h-1 above the Earth's surface 104, the height h-1 being less than the height h. It is conceivable for the detectable pattern 77 to be arranged in a different configuration of the fixed points on the coupling side 72, in particular with a different number of fixed points. The detection unit 100 is connected to a control unit, in particular via a wired connection or a wireless link, to evaluate the detectable pattern 77. In an evaluation, in particular by means of triangulation, a current distance 106 and/or a current angle 108 between the trailer 60, 60a and the traction vehicle 64 and/or a height h of the trailer 60, 60a are determined. The evaluation is preferably carried out on the basis of the subset of pixels which have detected the detectable pattern 77. If the current angle 108 and/or the current distance 106 are not suitable for an optimal coupling process, then, for example, wheel alignments of the traction vehicle 64 can be modified so that a coupling process can be carried out in the best possible way. The fixed points 78 are arranged on the coupling side 72 of the trailer 60, 60a at a constant specified distance 102. A constant specified distance 102 between two fixed points 78 can be different to a constant specified distance 102 between two other fixed points 78, as can be discerned from the triangle configuration in accordance with FIGS. 5A and 5B.

The detection unit 100, in particular the camera system 75, detects an image with a constant specified total number of pixels, wherein the detectable pattern 77 and/or the trailer edges is/are captured in a subset of the total number of pixels and by evaluating the subset of pixels on which the detectable pattern 77 and/or the trailer edges is/are captured, a current distance 106 and/or an angle 108 between the detection unit 100 and the trailer 60, 60a can be determined. In particular, a height h of the trailer 60, 60a above the Earth's surface 104 can be determined by the detection unit 100. The detected height h therefore specifies a distance to the earth's surface 104, which allows a loading condition of the trailer 60, 60a to be estimated. In particular, due to the height definition h an overloading of the trailer 60, 60a can be detected, in which a coupling process would lead to damage to the traction vehicle 64 and/or the trailer 60, 60a. The fewer pixels that capture the detectable pattern 77, the greater is the current distance 106 between the trailer 60, 60a and the traction vehicle 64. On the other hand, the more pixels that capture the detectable pattern 77, the smaller is the current distance 106 between the trailer 60, 60a and the traction vehicle 64. In addition, an asymmetric distribution of the subset of pixels which have captured the detectable pattern 77 indicates that the trailer 60, 60a and the traction vehicle 64 are at an angle 108 to each other. Asymmetric distribution in the present context means that, for example, in one region on the coupling side 72 a number n>0 of pixels has detected a fixed point 78, while another symmetrically arranged fixed point 78 has only been detected by a number m>0 of pixels, where m<n and m, n are whole natural numbers. If an angle of approximately 90° were given between an extension of the detection unit 100 and the coupling side 72, then m=n would be true. This is equivalent to an extension of the detection unit 100 parallel to the extension of the trailer 60, 60a in the z direction (see FIGS. 5A and 5B).

LIST OF REFERENCE NUMERALS

10: trailer control device
12: transmitter unit
14: signal transmission
16: receiver unit
18: signal transmission
20: receiver unit
24: comparator
26: signal transmission
28: memory unit
30: transmitter unit
32: signal transmission
34: energy source
36: position determination unit
37: evaluation unit
38: encryption unit/decryption unit
38a: decryption unit
38b: encryption unit
40-50: signal transmission
60: trailer
62: king pin
64: traction vehicle
65: coupling side of the traction vehicle
66: signal transmission
68: signal transmission
70: external GPS unit
72: coupling side of the trailer
76: camera system
77: detectable pattern
78: fixed point
80: system
82: tires
84: edge
91-94: pre-defined position or pre-defined region
100: detection unit
102: pre-defined distance
104 Earth's surface
106 current distance
108 angle
H: height
B: width
h: height above the earth's surface
h-l: height above the earth's surface, where h-l<h

The invention claimed is:

1. A trailer arrangement, comprising:
a trailer control device mounted on a trailer and configured to receive and send a signal, the control device comprising:
a receiver unit configured to receive a signal from an external transmitter unit; a comparator connected to the receiver unit and configured to compare the received signal with a pre-defined signal stored in the comparator; a transmitter unit connected to the comparator and configured to send a response signal to an external receiver unit for locating and/or identifying the trailer control device if the received signal matches the pre-defined signal; and a position determination unit configured to determine a current position of the trailer control device;
wherein the trailer control device is configured to control the comparator, the receiver unit, the transmitter unit and the position determination unit; wherein the comparator is configured to compare the received signal with the pre-defined signal;
wherein the trailer control device is configured to control the transmitter unit such that the transmitter unit sends at least one response signal for locating and/or identifying the trailer to an external receiver unit after detecting a match between the received signal and the pre-defined signal;
wherein the trailer control device is arranged at a specified position on or in the trailer; wherein the trailer control device is arranged at an equal distance from two edges of the trailer and at a defined distance from a king pin of the trailer to enable a location of the trailer; and
wherein a response signal emitted by the trailer control device comprises at least one of information on the dimensions of the trailer, and a position of the king pin in relation to the trailer control device or to a front side of the trailer.

2. The trailer arrangement as claimed in claim 1, wherein the trailer control device further comprises an encryption unit configured to encrypt the response signal and/or a decryption unit configured to decrypt the received signal, and wherein the encryption unit and/or the decryption unit is/are connected between the receiver unit and the comparator or between the transmitter unit and the comparator.

3. The trailer arrangement as claimed in claim 1, wherein the trailer control device further comprises an encryption unit configured to encrypt the response signal and/or a decryption unit configured to decrypt the received signal, and wherein the position determination unit is connected to the comparator and/or the encryption unit or the decryption unit for communication purposes.

4. The trailer arrangement as claimed in claim 1, wherein the trailer control device further comprises a memory unit for storing the pre-defined signal and/or the current position and/or the response signal and/or other data, and wherein a memory unit is connected to at least one of the comparator, the receiver unit, the transmitter unit and the position determination unit, for the purpose of communication.

5. The trailer arrangement as claimed in claim 1, wherein the trailer control device includes an energy source configured to supply the trailer control device with energy.

6. The trailer arrangement as claimed in claim 1, wherein the trailer control device is permanently mounted to the trailer.

7. The trailer arrangement as claimed in claim 1, wherein the response signal comprises a coded identification signal for identifying the trailer and/or for identifying a current position of the trailer and/or for transmitting trailer vehicle data.

8. The trailer arrangement as claimed in claim 1, wherein a response signal emitted by the trailer control device comprises at least one of:
vehicle and/or order identification;
general data relating to the trailer;
alignment of the trailer;
order and/or load data including data relating to the contents and/or weight and/or delivery note;
loading state of the trailer;
fill level of a tank trailer;
refrigerated room temperature of the trailer;
maintenance condition and/or maintenance intervals and/or date of the last maintenance of the trailer;
tire pressure of the trailer;
mileage of the trailer;
fault and maintenance logs of the trailer; and
access logs for the cargo compartment of the trailer.

9. The trailer arrangement as claimed in claim 1, wherein a bar code, a matrix code, a number code or a color code is arranged on the trailer and/or on the trailer control device for the purpose of manual inspection an optical identification.

10. A locating system for locating and/or identifying a trailer with the trailer comprising:
a trailer control device mounted on the trailer and configured to receive and send a signal, the control device comprising:
a receiver unit configured to receive a signal from an external transmitter unit; a comparator connected to the receiver unit and configured to compare the received signal with a pre-defined signal stored in the comparator; a transmitter unit connected to the comparator and configured to send a response signal to an external receiver unit for locating and/or identifying the trailer control device if the received signal matches the pre-defined signal; and a position determination unit configured to determine a current position of the trailer control device;
wherein the trailer control device is configured to control the comparator, the receiver unit, the transmitter unit and the position determination unit;
wherein the comparator is configured to compare the received signal with the pre-defined signal;
wherein the trailer control device is configured to control the transmitter unit such that the transmitter unit sends at least one response signal for locating and/or identifying the trailer to an external receiver unit after detecting a match between the received signal and the pre-defined signal;
wherein the trailer control device is arranged at a specified position on or in the trailer;
wherein the trailer control device is arranged at an equal distance from two edges of the trailer and at a defined distance from a king pin of the trailer to enable a location of the trailer; and
wherein a response signal emitted by the trailer control device comprises at least one of information on the dimensions of the trailer, and a position of the king pin in relation to the trailer control device or to a front side of the trailer; an external transmitter unit configured to send a signal to the trailer control device to locate the trailer; and
an external receiver unit configured to receive a response signal from the trailer control device for the identification of the located trailer;
wherein the trailer control device emits the response signal if a match is detected between the received signal and the pre-defined signal stored in the trailer control device.

11. The locating system as claimed in claim 10, wherein the trailer control device is mounted on the trailer such that an external receiver unit identifies a position of the located trailer.

12. The locating system as claimed in claim 11, wherein after detection of a match between the emitted signal and the pre-defined signal stored in a trailer control device, only one trailer control device sends the response signal to the external receiver unit.

13. The locating system as claimed in claim 10, wherein the external transmitter unit is configured to send the at least one signal to a plurality of trailer control devices at the same time.

14. The locating system as claimed in claim 10, wherein the response signal is configured to support an automatic coupling process between the located trailer and a tractor vehicle which comprises the external receiver unit by the transmission of location coordinates.

* * * * *

UNITED STATES PATENT AND TRADEMARK OFFICE
CERTIFICATE OF CORRECTION

PATENT NO. : 10,843,515 B2
APPLICATION NO. : 16/639693
DATED : November 24, 2020
INVENTOR(S) : Mario Sebastian Köster It is certified that error appears in the above-identified patent and that said Letters Patent is hereby corrected as shown below:

In the Specification

Column 4, Line 16:
After "vehicle" delete "/"

Column 8, Line 2:
"h" should be — H —

Column 8, Line 31:
Delete "unit"

Column 8, Line 46:
"a" should be — an —

Column 8, Lines 47, 50, 58:
"h" should be — H —

Column 9, Lines 13, 15, 18:
"h" should be — H —

Column 9, Line 16:
"earth's" should be — Earth's —

Column 10, Lines 12, 13, 14:
There is no ":" after the reference numerals

Column 10, Lines 17, 18:
"earth's" should be — Earth's —

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*

In the Claims

Column 10, Claim 1, Line 25:
There should be a new ¶ after "unit;"

Column 10, Claim 1, Lines 27-28:
There should be a new ¶ after "comparator;"

Column 10, Claim 1, Line 37:
There should be a new ¶ after "unit;"

Column 10, Claim 1, Line 47:
There should be a new ¶ after "trailer;"

Column 11, Claim 9, Line 41:
"an" should be — and —

Column 11, Claim 10, Line 48:
There should be a new ¶ after "unit;"

Column 11, Claim 10, Line 50-51:
There should be a new ¶ after "comparator;"

Column 12, Claim 10, Line 1:
There should be a new ¶ after "and"

Column 12, Claim 10, Line 20:
Delete "and"

Column 12, Claim 10, Line 25:
There should be a new ¶ after "trailer;"